(12) United States Patent
Wurth et al.

(10) Patent No.: US 10,024,488 B2
(45) Date of Patent: Jul. 17, 2018

(54) THREE-BEAM CONSTRUCTION APPARATUS

(71) Applicant: Wurtec, Incorporated, Toledo, OH (US)

(72) Inventors: Steven P. Wurth, Sylvania, OH (US); Terry Rodebaugh, Whitehouse, OH (US)

(73) Assignee: WURTEC, INCORPORATED, Toledo, OH (US)

( * ) Notice: Subject to any disclaimer, the term of this patent is extended or adjusted under 35 U.S.C. 154(b) by 0 days.

(21) Appl. No.: 14/873,435

(22) Filed: Oct. 2, 2015

(65) Prior Publication Data

US 2016/0097484 A1  Apr. 7, 2016

Related U.S. Application Data

(60) Provisional application No. 62/060,165, filed on Oct. 6, 2014.

(51) Int. Cl.
*F16M 13/02* (2006.01)
*B66B 19/00* (2006.01)

(52) U.S. Cl.
CPC .............. *F16M 13/02* (2013.01); *B66B 19/00* (2013.01)

(58) Field of Classification Search
CPC ........... E04G 1/36; E04G 1/367; E04G 27/00; E04G 3/18; E04G 3/20; E04G 3/24; E04B 1/003; B66B 9/00; F16M 13/02
USPC ....... 182/82, 138, 186.9; 187/401, 404, 900; 248/235, 240, 240.4, 324; 52/30, 73, 52/283, 650.3, 653.1, 653.2, 654.1, 701, 52/90.1, 92.2, 92.3, 93.1, 94
See application file for complete search history.

(56) References Cited

U.S. PATENT DOCUMENTS

| 434,701 | A | | 8/1890 | Conway |
|---|---|---|---|---|
| 983,578 | A | | 2/1911 | Stresenreuter |
| 1,745,045 | A | | 1/1930 | Romine |
| 2,236,019 | A | * | 3/1941 | Thompson .............. B66B 9/187 187/239 |
| 2,431,194 | A | | 11/1947 | O'Brien |

(Continued)

FOREIGN PATENT DOCUMENTS

| EP | 1063368 B1 | 5/2005 | |
|---|---|---|---|
| FR | 2641018 A1 | 12/1988 | |
| WO | WO 0070169 A1 * | 11/2000 | ............... E04G 3/18 |

*Primary Examiner* — Jonathan Liu
*Assistant Examiner* — Guang H Guan
(74) *Attorney, Agent, or Firm* — MacMillan, Sobanski & Todd, LLC

(57) ABSTRACT

A construction apparatus is provided and span members connected together at a first end by a first connector, the span members having a first end, a second end and a length. Sill brackets are connected to the first end of the span members and are configured to seat against an entrance sill. A second connector connects the span members together at a second end and is configured to seat against a hoistway structure. A plurality of apertures is arranged on the span members and configured to allow a connection to hoist devices. The span members rotate about the sill brackets and the lengths of the span members are longer than a horizontal distance from the entrance sill to the hoistway structure such that when the apparatus is in a seated orientation, the construction apparatus rests in an inclined orientation with respect to a substantially horizontal axis.

11 Claims, 9 Drawing Sheets

(56) References Cited

U.S. PATENT DOCUMENTS

| | | | |
|---|---|---|---|
| 2,531,930 A | 11/1950 | Woolslayer et al. | |
| 2,569,821 A | 10/1951 | Maxeiner | |
| 3,085,785 A | 4/1963 | Peterson | |
| 3,463,334 A | 8/1969 | Blakely et al. | |
| 3,513,987 A | 5/1970 | Seyff | |
| 3,797,607 A * | 3/1974 | Gargasz | E04G 5/06 182/120 |
| 4,122,916 A | 10/1978 | Strobel | |
| 4,125,174 A | 11/1978 | Lienhard | |
| 4,270,628 A | 6/1981 | Anderson | |
| 4,560,074 A | 12/1985 | Manning | |
| 4,600,086 A | 7/1986 | Yamasaki et al. | |
| 4,621,741 A | 11/1986 | Boon | |
| 5,230,404 A * | 7/1993 | Klein | B66B 19/00 187/414 |
| 5,299,654 A * | 4/1994 | Duncan | E04G 21/3261 182/138 |
| 5,417,018 A | 5/1995 | Matsumoto et al. | |
| 5,622,237 A | 4/1997 | Moldow | |
| 6,082,068 A * | 7/2000 | Fisher | E04C 3/08 211/182 |
| 6,340,070 B1 * | 1/2002 | Villareal, Jr. | E04G 3/18 182/150 |
| 6,494,291 B2 * | 12/2002 | Ono | E04G 3/00 182/150 |
| 6,880,678 B1 | 4/2005 | Schneider et al. | |
| 7,044,313 B2 | 5/2006 | Haliburda, III | |
| 7,108,100 B2 | 9/2006 | Stingl | |
| 8,646,224 B2 | 2/2014 | Wurth | |
| 8,646,576 B2 | 2/2014 | Wurth et al. | |
| 8,714,306 B2 * | 5/2014 | Iturbe Beristain | E04G 21/3247 182/137 |
| 8,813,432 B2 | 8/2014 | Wurth | |
| 8,833,516 B1 * | 9/2014 | Wurth | E06C 1/12 14/69.5 |
| 2010/0068005 A1 * | 3/2010 | Wurth | E04G 21/14 414/10 |
| 2011/0024231 A1 * | 2/2011 | Wurth | E04G 3/24 182/113 |
| 2016/0097484 A1 * | 4/2016 | Wurth | B66B 19/00 248/324 |

\* cited by examiner

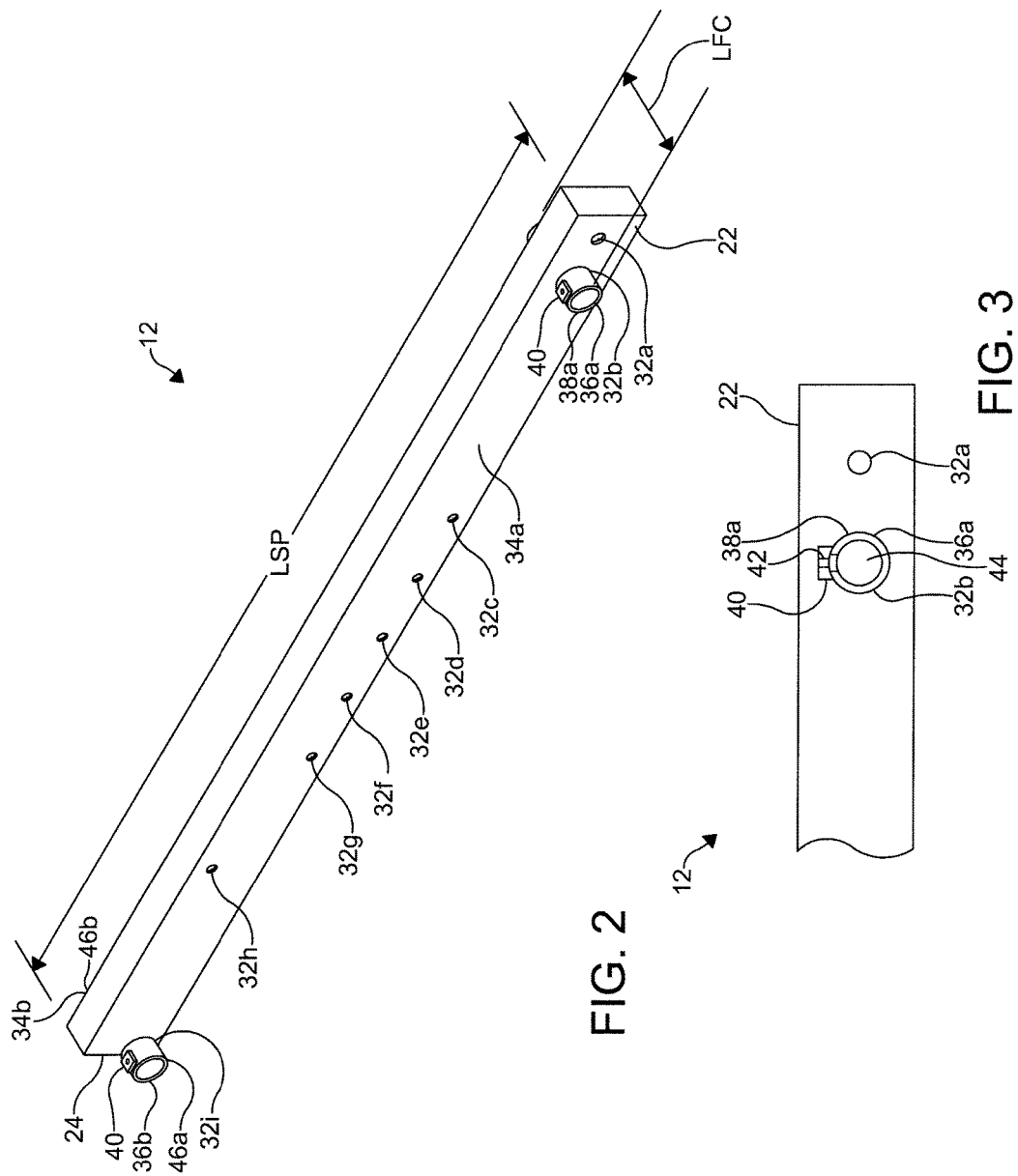

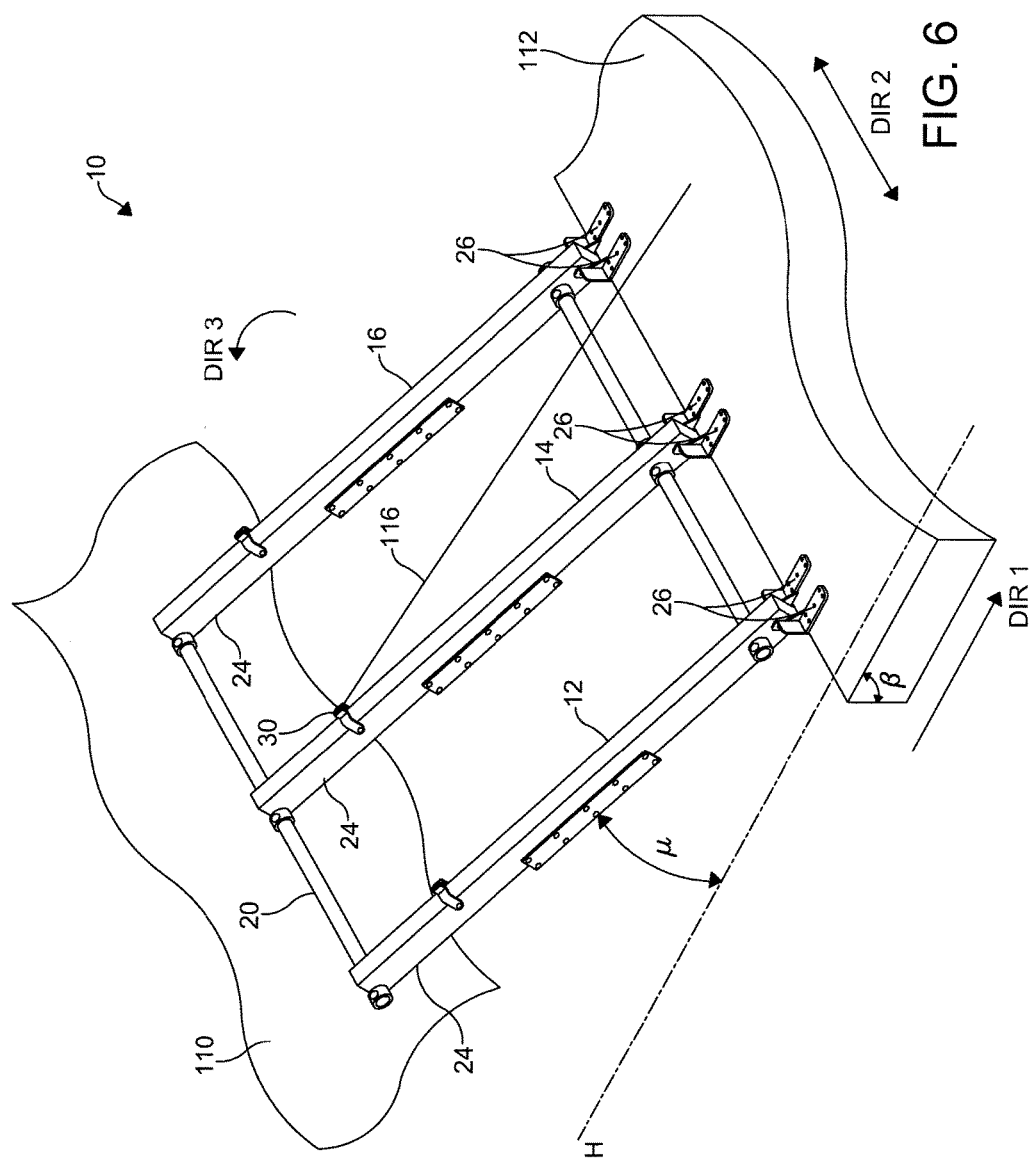

THREE-BEAM CONSTRUCTION APPARATUS

RELATED APPLICATIONS

This application claims benefit of U.S. Provisional Patent Application No. 62/060,165, filed Oct. 6, 2014, the disclosure of which is incorporated herein by reference in its entirety.

BACKGROUND

Structures, such as commercial buildings, can be built using a variety of construction materials and construction processes. One non-limiting example of a common construction material is concrete. Buildings built from concrete can have many building floors and can be constructed very quickly. In some cases, the completion or build-out of the lower building floors is started prior to the construction of the upper building floors. In these cases, various construction activities, such as for example, installation of plumbing pipes, electrical wires and elevator guide rails, can occur prior to the construction of the upper building floors.

The various construction activities often require heavier construction materials, such as for example pipes, panels, wires and guide rails to be installed near or on building floors located above the first floor. Because the upper floors have not been completed, the elevators within the building may not be available for use in transporting the heavier construction materials. In the construction of some buildings, the use of a crane for hoisting heavier construction materials may not be logistically feasible, cost-effective or efficient.

It would be advantageous to provide a construction apparatus that could be easily used within an elevator hoistway for hoisting construction materials.

SUMMARY

In accordance with embodiments of the three beam construction apparatus, there is provided a construction apparatus for use within an elevator hoistway. The construction apparatus includes a plurality of span members connected together at a first end by a first connector. Each of the span members has a first end, a second end and a length. A plurality of sill brackets is connected to the first ends of the span members and is configured to seat against an entrance sill. A second connector connects the span members together at a second end. The second connector is configured to seat against a hoistway structure. The hoistway structure is opposite the entrance sill. A plurality of apertures is arranged on the span members and configured to allow a connection to one or more hoist devices. The span members are configured to rotate about the sill brackets. The lengths of the span members are longer than a horizontal distance from the entrance sill to the hoistway structure such that when the construction apparatus is seated against the hoistway structure and the sill brackets are seated against the entrance sill, the construction apparatus rests in an inclined orientation with respect to a substantially horizontal axis.

In accordance with other embodiments, there is also provided a method of installing a construction apparatus for use within an elevator hoistway. The method includes the steps of connecting one or more installation lines to a lift bracket, seating one or more sill brackets against an entrance sill, rotating a second end of one or more span members forming the apparatus and connected to the sill brackets from an initial substantially vertical position toward a hoistway structure while maintaining tension in the installation line and seating the second end of the span members against a hoistway structure.

Various advantages of the three bream construction apparatus will become apparent to those skilled in the art from the following detailed description, when read in light of the accompanying drawings.

BRIEF DESCRIPTION OF THE DRAWINGS

FIG. 2 is a perspective view of a span member as used by the three beam construction apparatus of FIG. 1.

FIG. 3 is a side view, in elevation of a portion of the span member as used by the three beam construction apparatus of FIG. 1, illustrating a first collar.

FIG. 6 is a perspective view of the three beam construction apparatus of FIG. 1, shown in an installed position.

DETAILED DESCRIPTION

The three bream construction apparatus will now be described with occasional reference to the specific embodiments. The three bream construction apparatus may, however, be embodied in different forms and should not be construed as limited to the embodiments set forth herein. Rather, these embodiments are provided so that this disclosure will be thorough and complete, and will fully convey the scope of the three bream construction apparatus to those skilled in the art.

Unless otherwise defined, all technical and scientific terms used herein have the same meaning as commonly understood by one of ordinary skill in the art to which the three bream construction apparatus belongs. The terminology used in the description of the three bream construction apparatus herein is for describing particular embodiments only and is not intended to be limiting of the three bream construction apparatus. As used in the description of the three bream construction apparatus and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the three bream construction apparatus. Notwithstanding that the numerical ranges and parameters setting forth the broad scope of the three bream construction apparatus are approximations, the numerical values set forth in the specific examples are reported as precisely as possible. Any numerical values, however, inherently contain certain errors necessarily resulting from error found in their respective measurements.

In accordance with the described embodiments, a three beam construction apparatus is provided for use within an elevator hoistway. The three beam construction apparatus can be used for a variety of purposes, including the non-limiting examples of hoisting construction materials as a tie-off point for personal protection equipment utilizing lifelines. It will be understood the term "structure", as used herein, is defined to mean any building, facility or erection having more than one floor. The term "hoistway" as used herein, is defined to mean the vertical space located within a structure and within which an elevator travels. The term "hoisting", as used herein, is defined as the act of moving objects, groups of objects and/or materials from one location within a structure to another location.

Figure 1:
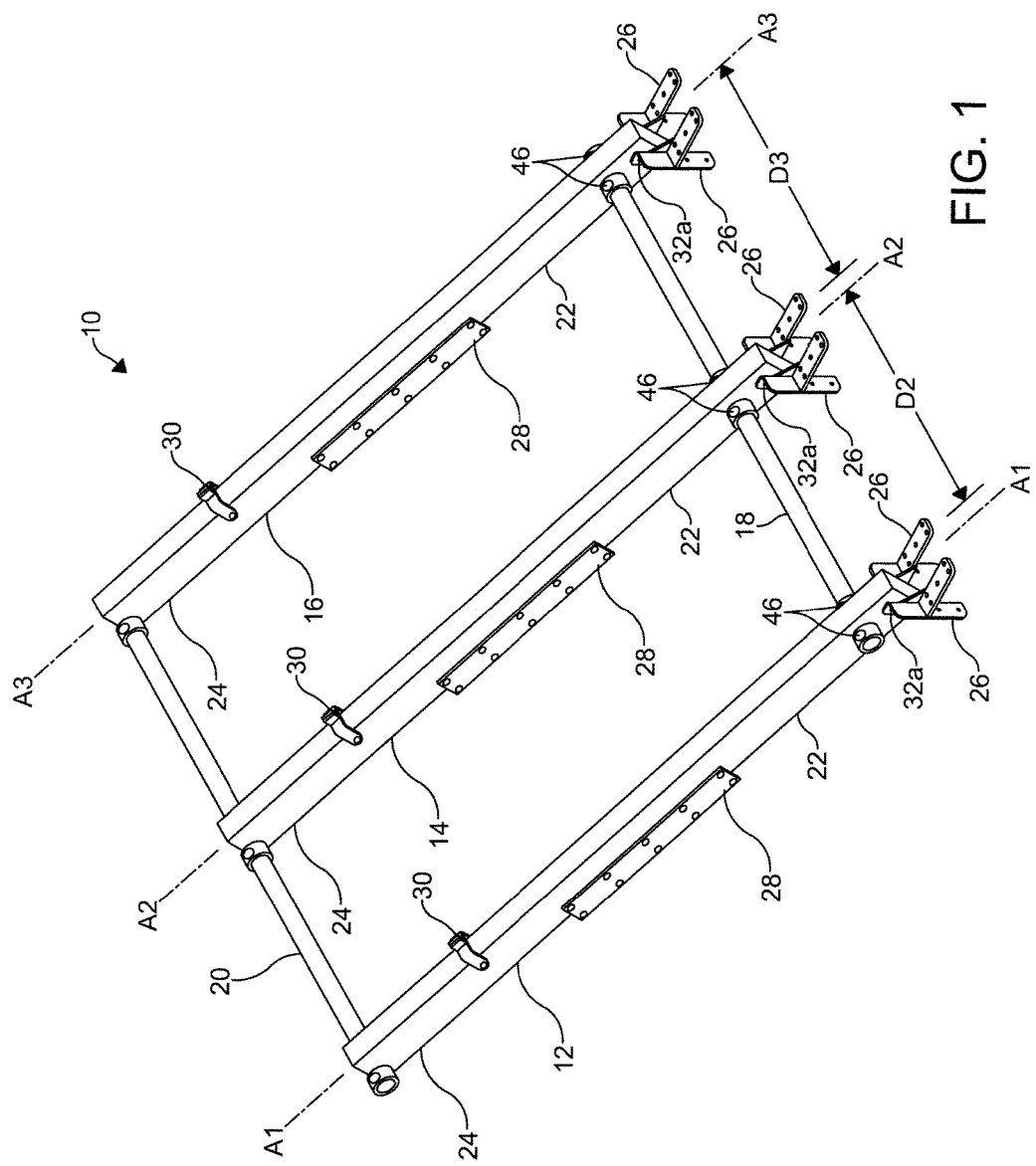
FIG. 1 is a perspective view of a first embodiment of a three beam construction apparatus.

Referring now to the drawings, there is illustrated in FIG. 1 a first embodiment of a three beam construction apparatus (hereafter "apparatus"), indicated generally at 10. Generally, in an installed position within an elevator hoistway, the apparatus 10 is oriented in an inclined position relative to a generally horizontal plane. In the inclined orientation, one end of the apparatus 10 seated against an entrance sill and the other end of the apparatus 10 seated against an opposing hoistway structure. As will be discussed in more detail below, the apparatus 10 has a length that is longer than a horizontal length of the elevator hoistway; thereby ensuring the apparatus 10 rests in an inclined orientation.

Referring again to FIG. 1, the apparatus 10 includes span members 12, 14, 16 fixed in a spaced apart orientation with first and second connectors 18, 20. The first connector 18 is arranged with a first end 22 of the span members 12, 14, 16 in a spaced apart orientation and the second connector 20 is arranged with a second end 24 of the span members 12, 14, 16 in a spaced apart orientation.

Referring again to FIG. 1, a plurality of sill brackets 26 is attached to the first end 22 of each of the span members 12, 14, 16 and a hoist bracket assembly 28 is attached to each of the span members 12, 14, 16 at a substantially centered location along longitudinal axis A1-A1, A2-A2 and A3-A3 of the span members 12, 14, 16. Finally, a lift bracket 30 is pivotally attached to each of the span members 12, 14, 16 at a location near the second end 24. The span members 12, 14, 16, connectors 18, 20, sill brackets 26, hoist bracket assemblies 28 and the lift brackets 30 will be discussed in more detail below.

Referring now to FIG. 2, a span member 12 is illustrated. The span member 12 is representative of the span members 14, 16. The span member 12 is a structural member configured to span the horizontal length of an elevator hoistway, when positioned at an inclined orientation. The span member 12 is further configured to support the weight of a hoist device and load. In the illustrated embodiment, the span member 12 is a structural tube, having a rectangular cross-sectional shape. However, the span member 12 can have other desired cross-sectional shapes, such as the non-limiting examples of squares, circles, channels, "H" shapes, "L" shapes, "T" shapes or "W" shapes, sufficient to span the horizontal length of an elevator hoistway and support the weight of a hoist device and load.

Referring again to FIG. 2, the span member 12 is formed from a metallic material, such as for example, steel. However, it should be appreciated that in other embodiments, the span member 12 can be formed from other materials, such as the non-limiting example of reinforced polymeric materials sufficient to span the horizontal length of an elevator hoistway, and when positioned at an inclined orientation, support the weight of a hoist device and load.

Referring again to FIG. 2, the span member 12 has a length LSP extending from the first end 22 to the second end 24. In the embodiment shown in FIG. 2, the span member 12 has a consistent cross-sectional shape along its length LSP. However, it should be appreciated that in other embodiments, segments of the span member 12 can be reinforced, thereby resulting in varying cross-sectional shapes along its length LSP.

In the embodiment illustrated in FIG. 2, the span member 12 is configured to support a maximum load of 2500 pounds, typical of loads formed by construction materials and loads formed by construction personnel lifelines. In other embodiments, the span member 12 can be configured to support maximum loads less than 2500 pounds or more than 2500 pounds. In the event the span member 12 is configured to support maximum loads of more than 2500 pounds, it is contemplated that the heavier loads could be formed by false cars, elevator machines and motors and certain heating and air conditioning components.

Referring again to FIG. 1, it is within the contemplation of the apparatus 10 that each of the span members 12, 14 and 16 can be configured to support the same maximum load or, alternatively, each of the span members 12, 14 and 16 can be configured to support different maximum loads.

Referring again to FIG. 2, the span member 12 includes a first aperture 32a, second aperture 32b, third aperture 32c, fourth aperture 32d, fifth aperture 32e, sixth aperture 32f, seventh aperture 32g, eighth aperture 32h and ninth aperture 32i. The aperture 32a-32i extend through the span member 12 from a first major side 34a to a second major side 34b. As will be explained in more detail below, the first aperture 32a is used to attach the sill brackets 26 to the span member 12, the second aperture 32b is used to fix the first connector 18, the third-seventh apertures 32c-32g are used to attach the hoist bracket assembly 28 to the span member 12, the eighth aperture 32h is used to attach the lift bracket 30 to the span member 12 and the ninth aperture 32i is used to fix the second connector 20.

Referring now to FIGS. 2 and 3, a first collar 36a is positioned within the second aperture 32b and attached to the span member 12. The first collar 36a can be attached to the span member 12 in any desired manner, including the non-limiting examples of welding and fasteners. The first collar 36a has a circumferential shape that corresponds to the cross-sectional shape of the second aperture 32b. In the illustrated embodiment, the circumferential shape of the first collar 36*a* and the cross-sectional shape of the second aperture 32*b* are circular, however, other shapes can be used.

Referring again to FIG. 2, the first collar 36*a* has a length LFC that is sufficient to extend beyond the first and second major sides 34*a*, 34*b* of the span member 12, thereby forming collar extensions 38*a*, 38*b*. Referring again to FIG. 3, each of the collar extensions 38*a*, 38*b* includes a pad 40 having a threaded aperture 42. The threaded aperture 42 extends through the pad 40 and intersects with an interior aperture 44 extending through the first collar 36*a*.

Referring again to FIG. 1, in operation, the first connector 18 is inserted into the interior apertures 44 of the first collars 36*a* of span members 12, 14, 16 and urged through the first collars 36*a* until the span members 12, 14, 16 are spaced apart along the first connector 18 at desired spacing intervals. Next, the first connecter 18 is attached to the span members 12, 14, 16 as fasteners 46 are threaded into the apertures 42 of the first collars 36 and securely tightened against the first connector 18. In this manner, the first ends 22 of each of the span members 12, 14, 16 is attached to the first connector 18. In the illustrated embodiment, the fasteners are set screws. However, in other embodiments, the fasteners can have other forms including hex head cap screws. In still other embodiments, the first connector 18 can be attached to the span members 12, 14, 16 with other structures, including the non-limiting examples of clips, clamps and brackets.

Figure 4:
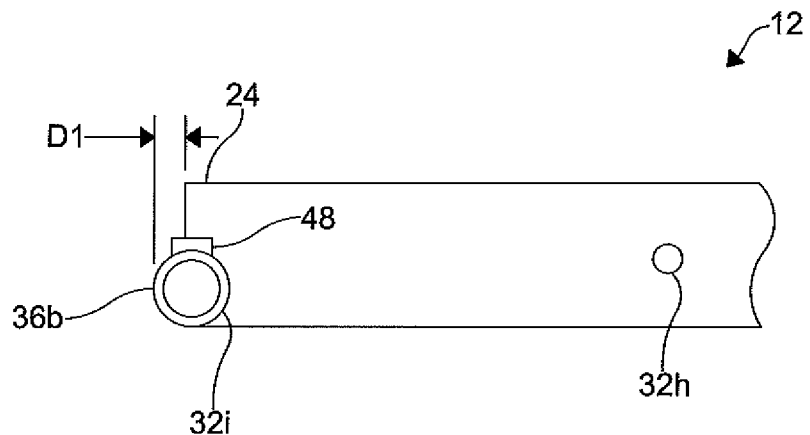
FIG. 4 is a side view, in elevation of a portion of the span member as used by the three beam construction apparatus of FIG. 1, illustrating a second connector.

Referring now to FIGS. 2 and 4, a second collar 36*b* is positioned within the ninth aperture 32*i* and attached to the span member 12. In the illustrated embodiment, the second collar 36*b* is the same as, or similar to, the first collar 36*a* shown in FIGS. 2 and 3 and described above. However, in alternate embodiments, the second collar 36*b* can be different than the first collar 36*a*. The second collar 36*b* can be attached to the span member 12 in any desired manner, including the non-limiting examples of welding and fasteners.

The ninth aperture 32*i* is located at the second end 24 of the span member 12 such that in an installed position, a portion of the second collar 36*b* extends a distance D1 beyond the end 24 of the span member 12. In the illustrated embodiment, the distance D1 is in a range of from about 0.5 inches to about 1.5 inches. However, in other embodiments, the distance D1 can be less than about 0.5 inches or more than 1.5 inches. The extending portion of the second collar 36*b* will be discussed in more detail below.

Referring again to FIG. 2, the second collar 36*b* includes collar extensions 46*a*, 46*b* and pads 48. In the illustrated embodiment, the collar extensions 46*a*, 46*b* and the pads 48 are the same as, or similar to, the collar extensions 38*a*, 38*b* and the pads 40 shown in FIGS. 2 and 3 and described above. However, in alternate embodiments, the collar extensions 46*a*, 46*b* and the pads 48 can be different than the collar extensions 38*a*, 38*b* and the pads 40. In operation, the second connector 20 is attached to the second collars 36*b* of span members 12, 14, 16 in the same manner as discussed above for the first connector 18.

Figure 5:
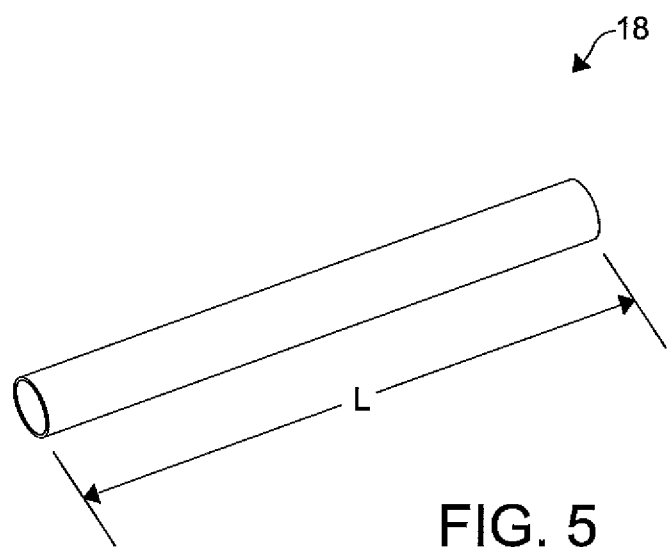
FIG. 5 is a perspective view of a connector as used by the three beam construction apparatus of FIG. 1.

Referring now to FIG. 5, the first connector 18 is illustrated. It should be appreciated the first connector 18 is representative of the second connector 20. The connector 18 has a length L configured to span the distance from the span members 12 to 16. In the illustrated embodiment, the length L is in a range of from about 24.0 inches to about 48.0 inches. Alternatively, the length L can be less than about 24.0 inches or more than about 48.0 inches sufficient to span the distance from the span members 12 to 16.

Referring again to FIG. 5, the first connector 18 is formed from a metallic material configured to provide structural support to the span members 12, 14, 16. In the illustrated embodiment, the metallic material is steel. However, in other embodiments, the first connector 18 can be formed from other materials, including the non-limiting example of reinforced polymeric materials, sufficient to provide structural support to the span members 12, 14, 16.

Referring again to the embodiment of the first connector 18 illustrated in FIG. 5, the first connector 18 is formed as a hollow structure, thereby providing a weight savings over structures having a solid configuration. In other embodiments, the first connector 18 can be formed with other configurations, sufficient to provide a lighter-weight structural support to the span members 12, 14, 16.

Referring again to FIG. 1, the span members 12, 14, 16 are spaced apart along the first and second connectors 18, 20. A distance D2 is formed between span members 12 and 14 and a distance D3 is formed between the span members 14 and 16. In the illustrated embodiment, the distances D2, D3 are the same and are in a range of from about 12.0 inches to about 24.0 inches. However, in other embodiments, the distances D2, D3 can be different from each other and can be less than about 12.0 inches or more than about 24.0 inches.

Referring again to FIG. 1, one or more sill brackets 26 are connected to the first end 22 of each of the span members 12, 14 and 16. The sill brackets 26 are configured to seat against an entrance sill 50 and further configured to allow the span members 12, 14 and 16 to collectively pivot as shown in FIG. 6.

Figure 7A:
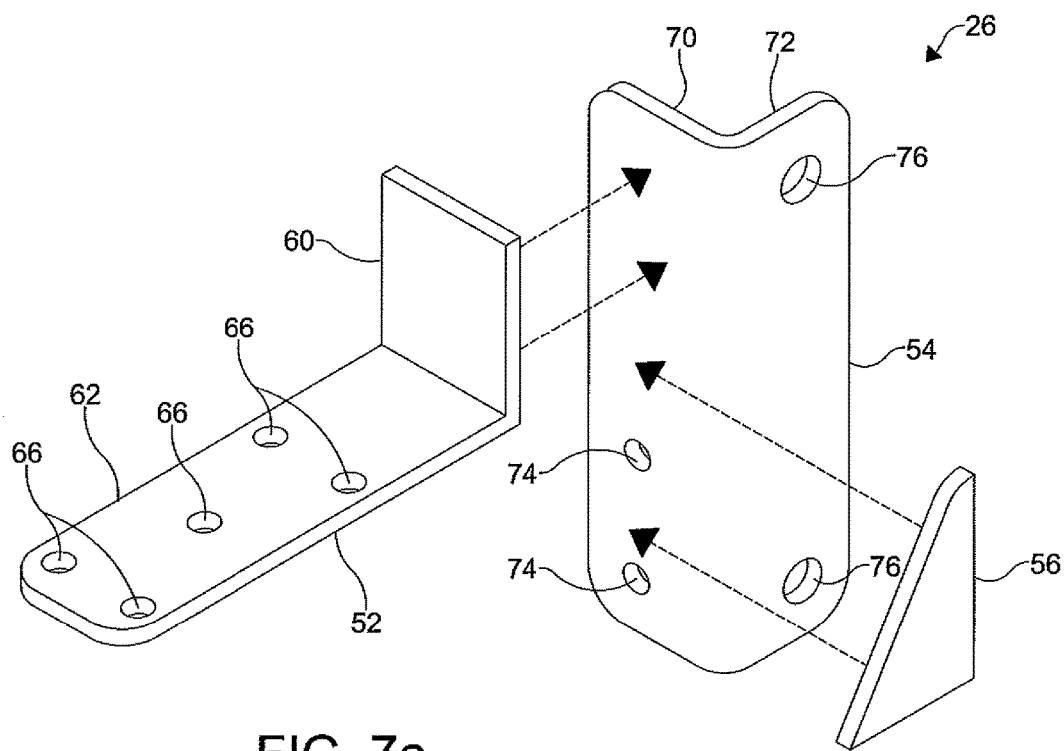
FIG. 7*a* is a perspective exploded view of a sill bracket as used by the three beam construction apparatus of FIG. 1.
Figure 7B:
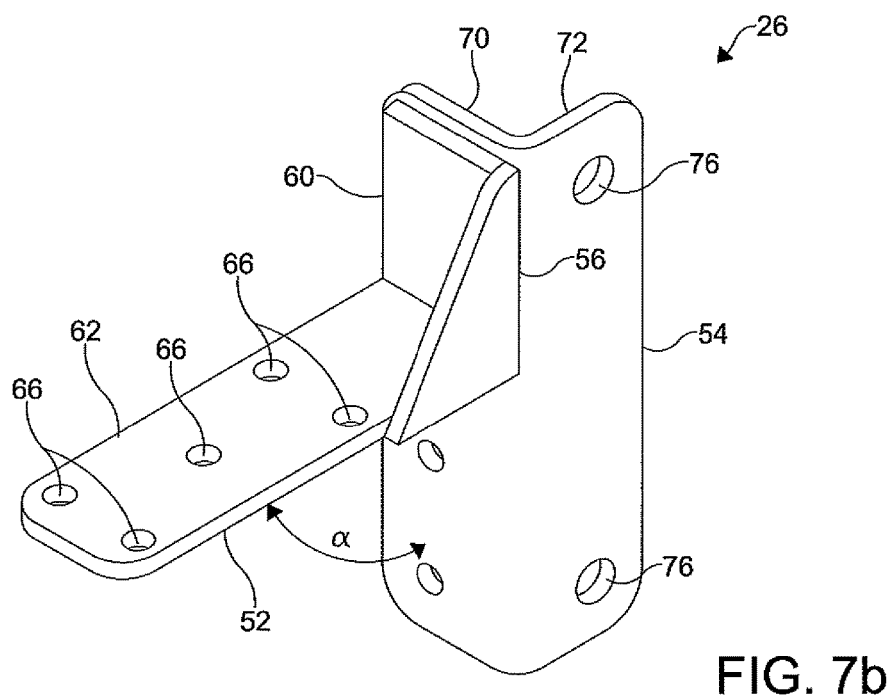
FIG. 7*b* is a perspective assembled view of a sill bracket as used by the three beam construction apparatus of FIG. 1.

Referring now to FIGS. 7*a*, 7*b*, a sill attachment 26 is illustrated. The sill attachment 26 includes a sill member 52, a connector member 54 and an optional brace member 56.

Referring again to FIGS. 7*a*, 7*b*, the sill member 52 includes a first leg 60 extending from a second leg 62. The first leg 60 is configured for attachment to the connector member 62. In the illustrated embodiment, the first leg 60 is attached to the connector member 62 by welding. However, in other embodiments, the first leg 60 can be attached to the connector member by other structures and methods, including the non-limiting examples of clips, clamps and mechanical fasteners. As shown in FIG. 7*b*, the second leg 62 forms a first angle α with a face of the connector member 62. The angle α corresponds to a second angle β formed by the entrance sill 50 such that the sill member 52 can seat against the entrance sill 50. In the illustrated embodiment, the first and second angles α and β are in a range of from about 80.0° to about 100.0°. In alternate embodiments, the first and second angles α and βcan be less than about 80.0° or more than about 100.0°, sufficient that the sill member52 can seat against the entrance sill 50.

Referring again to FIGS. 7*a*, 7*b*, the second leg 62 includes a plurality of apertures 66 extending therethrough. The apertures 66 will be discussed in more detail below.

In the embodiment illustrated in FIGS. 7*a*, 7*b*, the sill member 52 has the cross-sectional shape of an "L", such as to facilitate the seating of the sill bracket 26 against the corner shape of the entrance sill 50. However, the sill member 52 can have other desired cross-sectional shapes sufficient to facilitate the seating of the sill bracket 26 against the corner shape of the entrance sill 50.

Referring again to FIGS. 7*a*, 7*b*, the connector member 54 includes a first segment 70 extending from a second segment 72. The first segment 70 includes an upper region configured to receive the first leg 60 of the sill member 52 and a lower region having a plurality of apertures 74. The second segment 72 includes a plurality of apertures 76. The connector member 54 is configured to connect the sill member 52 to a span member 12, 14 or 16 such that an aperture 76 aligns with the first aperture 32a in the span members 12, 14 or 16, thereby allowing the sill bracket 26 to rotate around the first aperture 32a as shown in FIG. 1.

Referring again to FIGS. 7a, 7b, an optional brace member 56 connects the sill member 52 with the connector member 54. The brace member 56 is configured as a structural support for the sill bracket 26. The brace member 56 can have any desired shape, size, configuration and orientation and can connect the sill member 52 with the connector member 54 in any desired manner sufficient to provide structural support to the sill bracket 26. However, it should be appreciated that the brace member 56 is optional and not required for operation of the apparatus 10.

Referring again to FIGS. 7a, 7b, the sill member 52, connector member 54 and the brace member 56 are formed from a metallic material, such as for example, steel. However, the sill member 52, connector member 54 and the brace member 56 can be made of other desired materials, such as for example aluminum or polymeric materials, sufficient to seat against the entrance sill 50 and prevent the movement of the apparatus 10 in directions DIR1 and DIR2 (see FIG.6). In some embodiments, the inside surfaces of the sill bracket 26 may have one or more layers of slip resistant material.

Figure 8C:
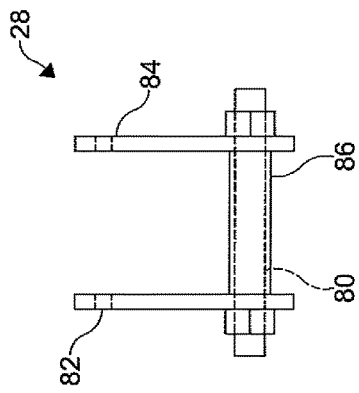
FIG. 8*c* is a front view, in elevation, of the hoist bracket assembly of FIG. 8*a*.
Figure 8B:
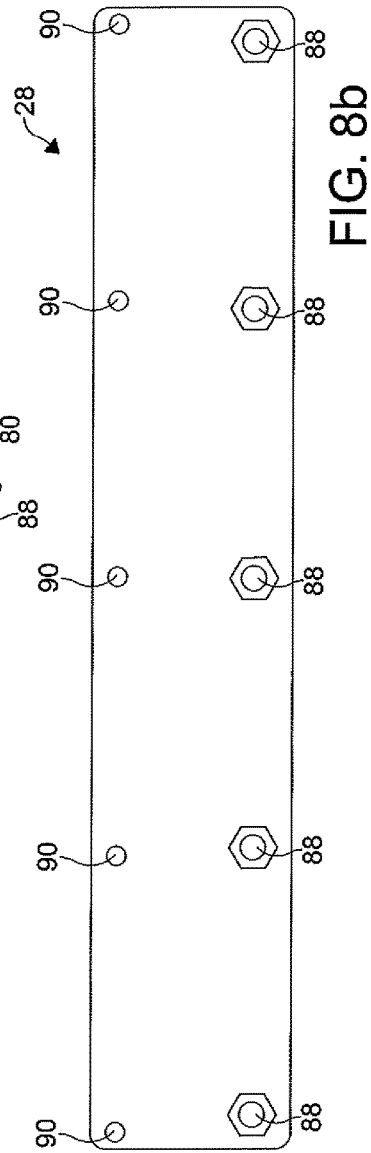
FIG. 8*b* is a side view, in elevation, of the hoist bracket assembly of FIG. 8*a*.
Figure 8A:
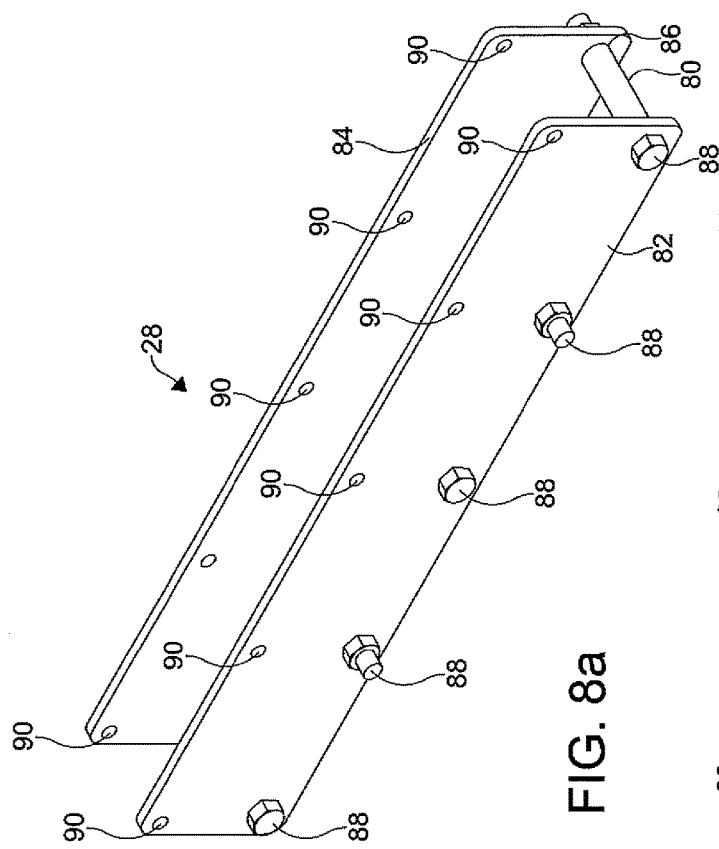
FIG. 8*a* is a perspective view of a hoist bracket assembly as used by the three beam construction apparatus of FIG. 1.

Referring again to FIG. 1, hoist bracket assemblies 28 are connected to the span members 12, 14 and 16 and configured to provide a plurality of "pick points" 80 as shown in FIGS. 8a, 8b and 8c. The term "pick point", as used herein, is defined to mean a connection point for a construction component, such as for example, a hook, line or rope.

Referring now to FIGS. 8a, 8b and 8c, the hoist bracket assemblies 28 include opposing plates 82, 84 spaced apart by a plurality of spacers 86. The spacers 86 are configured to receive mechanical fasteners 88 extending therethrough. The spacers 86 have a length that substantially approximates a width of the span members 12, 14 and 16. The mechanical fasteners 88 are configured to attach the plates 82, 84 and the spacers 86 together, thereby forming the hoist bracket assemblies 28. The opposing plates 82, 84 each have a plurality of aligned apertures 90 configured to allow fastening to the apertures 32c-32g located in the span members 12, 14 and 16. The hoist bracket assemblies 28 can be attached to the span members 12, 14 and 16 using any desired fastener.

Referring again to FIG. 1, the hoist bracket assemblies 28 are substantially centered along the longitudinal axis A1-A1, A2-A2, A3-A3 of the span members 12, 14 and 16. However, in other embodiments, the hoist bracket assemblies 28 can be positioned at other locations along the length of the span members 12, 14 and 16.

Figure 9:
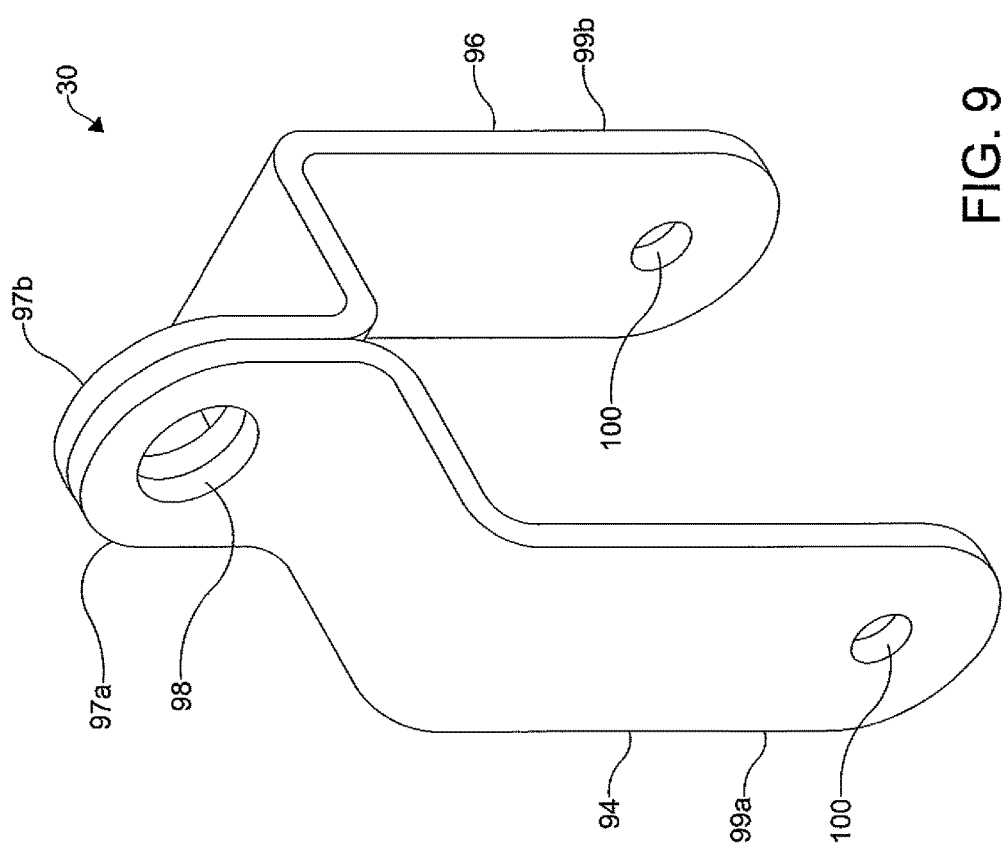
FIG. 9 is a perspective view of a lift bracket as used by the three beam construction apparatus of FIG. 1.

Referring again to FIG. 1, the lift brackets 30 are connected to the span members 12, 14 and 16. The lift brackets 30 are configured to allow the apparatus 10 to be rotated to a substantially vertical position, thereby allowing the apparatus 10 to be hoisted to other locations within an elevator hoistway without interfering with structures or equipment in the elevator hoistway. Referring now to FIG. 9, a lift bracket is shown generally at 30. The lift bracket 30 includes opposing lift members 94, 96. The lift members 94, 95 include an upper segment 97a, 97b. The upper segments 97a, 97b of the lift members 94, 96 are connected together and a lift aperture 98 is formed therethrough. The lift members 94, 96 include a lower segment 99a, 99b. The lower segments 99a, 99b of the lift members 94, 96 include aligned apertures 100. In operation, the lower segments 99a, 99b of the lift member 94, 96 span the span members 12, 14 and 16 such that the apertures 100 in the lower segments 99a, 99b align with the apertures 32h in the span members 12, 14 and 16. In a next step, the lift bracket 30 can be attached to the span members 12, 14 and 16 using any desired fastener sufficient to allow the apparatus 10 to be rotated to a substantially vertical position, thereby allowing the apparatus 10 to be hoisted to other locations within an elevator hoistway without interfering with structures or equipment in the elevator hoistway.

While the lift bracket 30 has been illustrated in FIG. 9 and described above, it is within the contemplation of the apparatus 10 that the lift brackets 30 can have other structures and can be formed from other devices, suitable to allow the apparatus 10 to allow the apparatus 10 to be rotated to a substantially vertical position, thereby allowing the apparatus 10 to be hoisted to other locations within an elevator hoistway without interfering with structures or equipment in the elevator hoistway.

Referring now to FIG. 6, the apparatus 10 is shown in an installed position. The sill brackets 26 are seated against the entrance sill 50 and the second connector 20 is seated against a hoistway structure 110. In the illustrated embodiment, a quantity of two sill brackets 26 are connected to each of, the span members 12, 14 and 16. In other embodiments, more or less than two sill brackets 26 can be used by each of the span members 12, 14 and 16. Further, while the illustrated embodiment shows each of the span members 12, 14 and 16 as having a quantity of two sill brackets, in still other embodiments, the span members 12, 14 and 16 can have differing quantities of sill brackets 26.

In the embodiment illustrated in FIG. 6, the hoistway structure 110 is a concrete wall. However, in other embodiments, the hoistway structure 110 can be any structure found in a hoistway and suitable for supporting constructing loads. Non-limiting examples of hoistway structures include structural frameworks, block walls and divider beams. The span members 12, 14 and 16 of the apparatus 10 form an angle $\mu$ with a substantially horizontal axis H-H. Axis H-H is defined as a line perpendicular to the hoistway structure 110 and parallel to a floor pad 112. Angle $\mu$ prevents the apparatus 10 from falling down the hoistway. In the illustrated embodiment, angle $\mu$ is approximately 30°. However, angle $\mu$ can be in a range of from about 20° to about 70°, sufficient to prevent the apparatus 10 from falling down the hoistway.

Referring again to FIG. 6, it is within the contemplation of the apparatus 10 that the second connector 20 and/or the second ends 24 of the span member 12, 14 and 16 can include other structures, mechanisms or devices configured for seating against the hoistway structure 110 and providing support for the apparatus 10 at the desired angle $\mu$. Non-limiting examples of other structures, mechanisms or devices can include pivoting angles or spring-loaded members. In still other embodiments, the outside surface of the second connector 20 may have one or more layers of slip resistant materials.

Referring again to FIG. 6, the positioning and operation of the apparatus 10 will be described. Initially, an operator connects an installation line 116 to the lift bracket 30. While the illustrated embodiment shows a single installation line 116 connected to the lift bracket 30 of the span member 14, it should be appreciated that any number of installation lines 116 can be connected to lift brackets connected to any desired span member. Next, the operator seats the sill brackets 26 against the entrance sill 50. Optionally, fasteners (not shown) can be inserted through the apertures 66, 74 located in the sill bracket 26 and attached to the entrance sill 50 and/or the floor pad 112. The fasteners are configured to prevent movement of the apparatus 10 in a first direction DIR1, away from the hoistway structure 110, and also prevent the movement of the apparatus 10 in a second direction DIR2, along an edge of the entrance sill 50. In the illustrated embodiment, the fasteners are concrete anchors. Alternatively, the fasteners can be any desired structure sufficient to prevent movement of the apparatus in the directions DIR1 and DIR2.

Referring again to FIG. 6 in a next step, initially the apparatus 10 is in a substantially vertical position. Next, the second ends 24 of the span members 12, 14 and 16 are jointly rotated toward the hoistway structure 110, in direction DIR3, as the operator maintains tension in the installation line 116. The second connector 20 of the apparatus 10 continues to rotate toward the hoistway structure 110 until the second connector 20 seats against the hoistway structure 110. Once the apparatus 10 is positioned such that the second connector 20 is seated against the hoistway structure 110 and the sill brackets 26 are seated against the entrance sill 50, the apparatus 10 is in position for use.

Figures 10A, 10B:
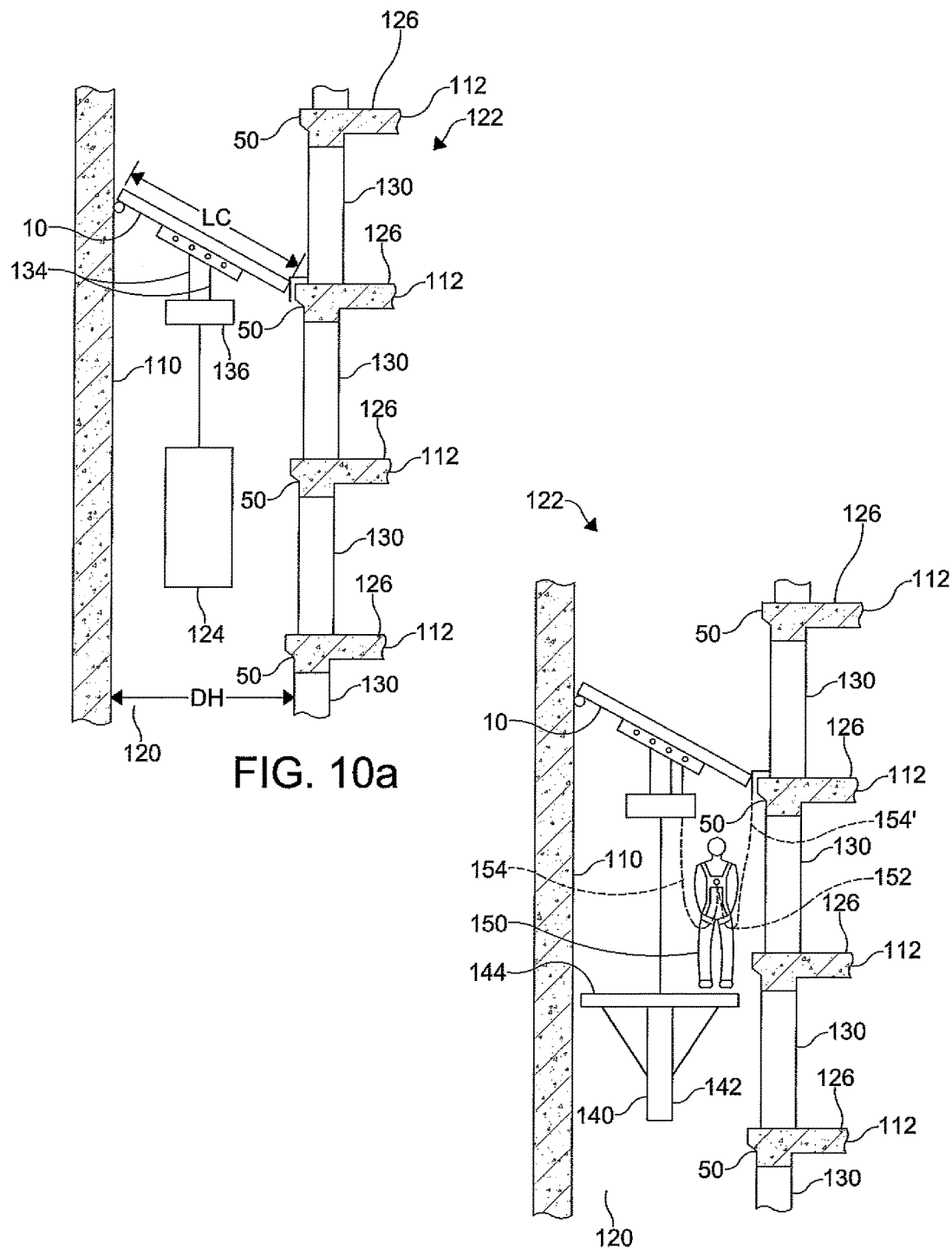
FIG. 10*a* is a schematic side view of the three beam construction apparatus of FIG. 1 shown in an installed position within a hoistway and used for hoisting of construction materials.
FIG. 10*b* is a schematic side view of the three beam construction apparatus of FIG. 1 shown in an installed position within a hoistway and used for hoisting a false car and also used as a tie-off for personnel protection equipment.

Referring now to FIGS. 10a, 10b, various non-limiting uses of the apparatus 10 will be illustrated in an elevator hoistway 120 of a building 122, both of which being conventional in the art. Referring first to FIG. 10a, use of the apparatus 10 to lift a load of construction materials 124 is illustrated.

Referring again to FIG. 10a, the building 122 includes a plurality of building floors 126. While the building 122 illustrated in FIG. 10a is shown having a quantity of four building floors 126, it should be understood that the building 122 can have more or less than four building floors 126. Each building floor 126 includes a floor pad 112, an elevator entrance 130 and an entrance sill 50. The floor pad 112 is configured to provide a working surface for each building floor 126. In the illustrated embodiment, each floor pad 112 is constructed of reinforced concrete and has a thickness of approximately 10.0 inches. However, each floor pad 112 can be constructed of any appropriate material or materials, such as for example building steel, and can have a thickness of more or less than 10.0 inches.

The elevator entrance 130 is configured to separate a building floor 126 from the elevator hoistway 120 and provide an opening through which passengers can enter an elevator (not shown). The elevator entrance 130 can have any desired size, shape, thickness, and configuration.

The entrance sill 50 is a portion of the floor pad 112 and is positioned at the intersection of the floor pad 112 and the elevator hoistway 120. In the embodiment illustrated in FIG. 10a, the upper end of the entrance sill 50 facing the elevator hoistway 120 forms a corner. However, the upper end of the entrance sill 50 facing the elevator hoistway 120 can form other desired shapes, such as for example a rounded edge.

Referring again to FIG. 10a, the elevator hoistway 120 is bounded on one side by the plurality of elevator entrances 130 and on the other side by the hoistway structure 110. The hoistway structure 110 can extend from a bottom of the hoistway 120 to a top of the hoistway 120. In the illustrated embodiment, the hoistway structure 110 has no openings along its height. However, the hoistway structure can have any desired quantity of openings positioned at any desired location along its height.

The elevator hoistway 120 has a horizontal distance DH extending from the hoistway structure 110 to the elevator entrance 130. In the illustrated embodiment, the horizontal distance DH is approximately 8.0 feet. However, in other embodiments the horizontal distance DH can be more or less than approximately 8.0 feet.

Referring again to FIG. 10a, it can be seen that the construction apparatus 10, oriented in an inclined position, is configured to span the horizontal distance DH of the elevator hoistway 120, with one end of the construction apparatus 10 seated against the entrance sill 50 and the other end of the construction apparatus 10 seated against the hoistway structure 110. The construction apparatus 10 has a length LC that is longer than the horizontal distance DH of the elevator hoistway 120, thereby ensuring the construction apparatus 10 rests on an inclined orientation.

One or more lines 134 are connected to the construction apparatus 10. The lines 134 are configured to connect a hoist device 136 to one or more of the span elements of the construction apparatus 10. In the illustrated embodiment, the line 134 is made of a metal rope. However, the line 134 can be made of other materials or components, such as for example chain or straps, sufficient to connect the hoist device 136 to the apparatus 10.

The hoist device 136 can be configured to hoist a load 124 from one level of the building, such as the ground floor, to another level of the building, such as an upper building floor. In the illustrated embodiment, the hoist device 136 is any suitable mechanism or device, such as an electrical hoist, a manual hoist, a lever hoist, or a chain fall, sufficient to hoist a load 124 from one building floor 126 to another building floor 126. The load 124 can be any construction material, construction tool, or object desired at an upper or lower level of the building 126. The hoist device 136 can be connected to any available span member having a sufficient load rating.

Referring now to FIG. 10b, another non-limiting use of the apparatus 10 is illustrated. The apparatus 10 is positioned in the elevator hoistway 120, in an inclined angle between the hoistway structure 110 and the entrance sill 50 as discussed above. The apparatus 10 is connected to a hoist device 136 by lines 134 also as discussed above. However, in this embodiment, the hoist device 136 is used to hoist a false car 140. The false car 140 can be used as a temporary work platform during construction of the elevator. In the illustrated embodiment, the false car 140 includes opposing guide assemblies 142 configured for engagement with guide rails (not shown) and connected to a platform assembly 144. As will be explained in more detail below, the platform assembly 144 is configured for construction personnel and/or for holding construction materials. The hoist device 136 can be configured to hoist the false car 140 from one level of the building, such as the ground floor, to another level of the building, such as an upper building floor. The hoist device 136 can be connected to any available span member having a sufficient load rating for the false car 140.

Referring again to FIG. 10b, another non-limiting use of the apparatus 10 is illustrated. In this embodiment, construction personnel 150 may be equipped with personal protective equipment, such as for example a fall protection harness 152. One end of a safety line 154 may be connected to the harness 152 and the opposing end of the safety line 154 may be tied off to one or more of the span members of the apparatus 10. The safety line 154 can be connected to any available span member having a sufficient load rating for the personnel protection equipment. Optionally, a safety line 154' can be connected to the connector member 54 of the sill bracket 26.

Referring again to FIGS. 10a, 10b, advantageously the apparatus 10 incorporating a quantity of three span members 12, 14 and 16 can be configured for multiple uses. In one scenario, the outer span members 12, 16 are used to hoist construction materials, such as for example, guide rails and the center span member 14 is use to hoist a false car. In this scenario, hoist structures, such as for example snatch blocks (not shown) are attached to the outer span members 12, 16 and a lone hoist line extends from one snatch block to the other such that the hoisted construction materials are being supported by an outer span member 12 or 16 while the hoist line moves in an opposite direction and is supported by the opposing span member 12 or 16. However, it should be appreciated that the span members 12, 14, 16 can be configured for other hoisting arrangements.

Figure 11:
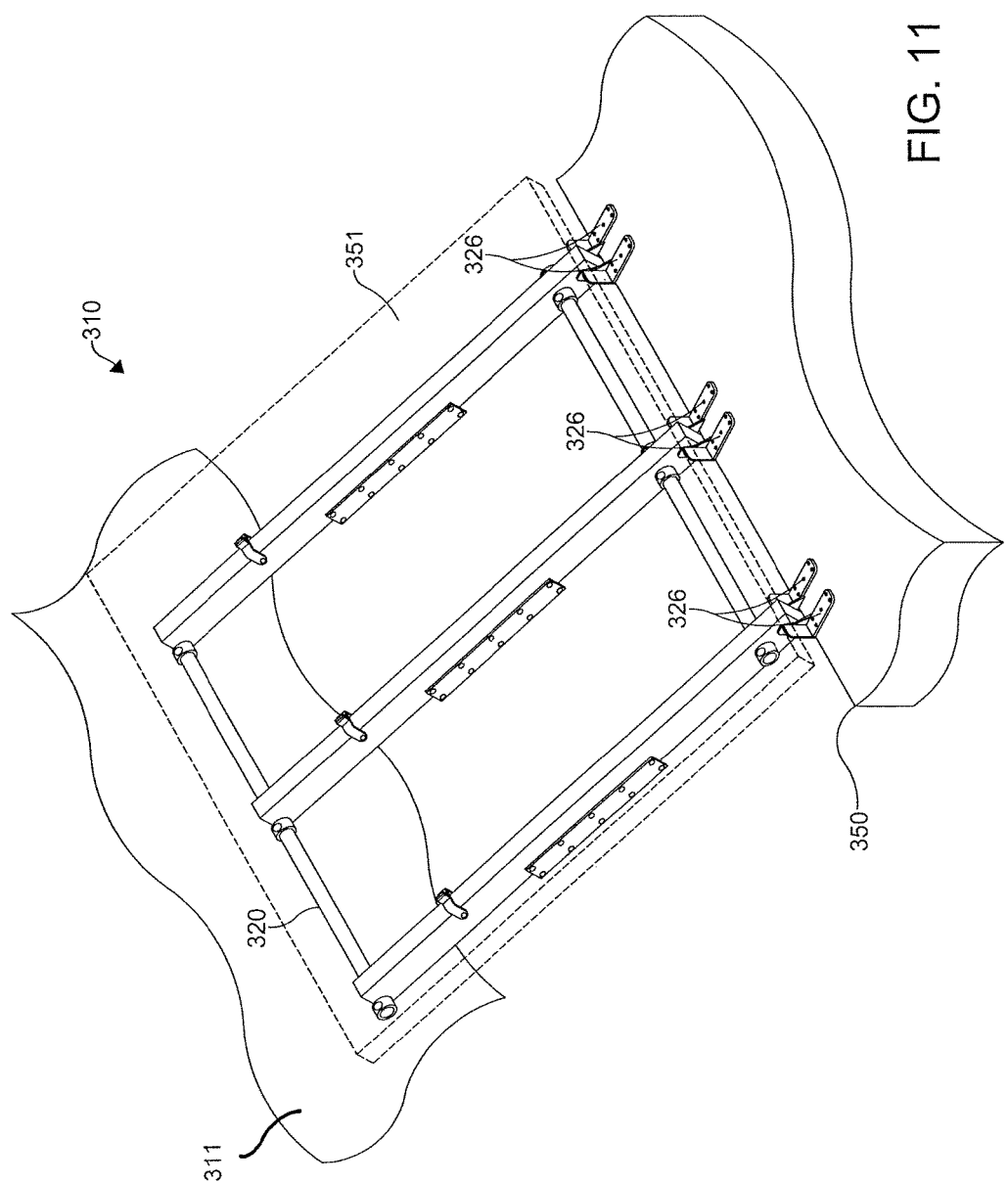
FIG. 11 is a perspective view of a second embodiment of a three beam construction apparatus shown in an installed position within a hoistway.

Referring now to FIG. 11, another embodiment and use of an apparatus is illustrated generally at 310. The apparatus 310 is illustrated in an installed position with a second connector 320 seated against a hoistway structure 311 and a plurality of sill brackets 326 seated against an entrance sill 350. In the illustrated embodiment, the apparatus 310 is the same as, or similar to, the apparatus 10 illustrated in FIG. 6 and described above. However, in other embodiments the apparatus 310 can be different from the apparatus 10.

Referring again, the apparatus 310 includes a covering 351. The covering 351 is attached to an upper surface of the apparatus 310 in any desired manner, including the non-limiting method of mechanical fasteners (not shown). While the embodiment shown in FIG. 11 illustrates the covering 351 as covering all portions of the apparatus 310, it should be appreciated that the covering 351 can be configured to cover less than all portions of the apparatus 310. In the illustrated embodiment, the covering 351 is formed from construction materials, such as for example plywood. However, the covering 351 can be formed from other desired materials. When installed in a hoistway as described above, the covering 351 is configured to shield construction personnel and/or objects positioned in the elevator hoistway from falling debris or objects.

In some circumstances, the apparatus 10 may be exposed to various weather conditions. Accordingly, the components comprising the apparatus 10 may have one or more suitable corrosion or oxidation preventative finishes. Examples of suitable corrosion or oxidation preventative finishes include corrosion inhibiting paints, zinc chromate and cadmium plating.

The principle and mode of operation of the three beam construction apparatus have been described in its preferred embodiments. However, it should be noted that the three beam construction apparatus may be practiced otherwise than as specifically illustrated and described without departing from its scope.

What is claimed is:

1. A construction apparatus configured for use within an elevator hoistway, the elevator hoistway having a plurality of entrance sills opposing a hoistway structure, the construction apparatus comprising:

a plurality of span members, each of the plurality of span members having a first end, a second end and a length, each of the plurality of span members having a first collar extending therethrough at the first end, the plurality of span members connected together at the first ends by a first connector extending through the first collars, each of the plurality of span members having a second collar extending therethrough at the second end, the plurality of span members connected together at the second ends by a second connector extending through the second collars;

a plurality of sill brackets connected to the first end of each of the plurality of span members and configured to be seated against one of the plurality of entrance sills; and a plurality of apertures arranged in each of the plurality of span members and configured to allow a connection to one or more hoist devices;

wherein the plurality of span members are configured to rotate about the plurality of sill brackets such that the construction apparatus is configured to be seated against the hoistway structure in a deployed state, while each of the plurality of sill brackets is configured to be seated against the one of the plurality of the entrance sills in the deployed state, wherein the second collars are configured to be seated against the hoistway structure in the deployed state with the hoistway structure horizontally spaced apart from the one of the plurality of entrance sills at a distance shorter than the length of each of the plurality of span members, such that the construction apparatus is adapted to rest in an inclined orientation with respect to a substantially horizontal axis in the deployed state;

wherein a hoist bracket assembly is connected to one of the plurality of span members, the hoist bracket assembly includes a pair of opposing plates, the opposing plates include a plurality of apertures, the plurality of apertures of the opposing plates are configured to align with the plurality of apertures arranged in the one of the plurality of span members, a plurality of fasteners are configured to be received through the plurality of apertures of the opposing plates and the plurality of apertures arranged in the one of the plurality of span members and wherein the hoist bracket assembly is substantially centered along a longitudinal axis of the one of the plurality of span members.

2. The construction apparatus of claim 1, wherein in the deployed state the construction apparatus is configured to form an angle with the substantially horizontal axis in a range from about 20° to about 70°.

3. The construction apparatus of claim 1, wherein one or more of the plurality of span members includes a lift bracket.

4. The construction apparatus of claim 3, wherein the lift bracket comprises a lift aperture, and wherein the lift aperture is configured to allow the construction apparatus to be positioned in a stowed state or the deployed state.

5. The construction apparatus of claim 4, wherein the construction apparatus is further configured for rotation to a substantially vertical orientation.

6. The construction apparatus of claim 1, wherein the plurality of span members are configured to support a weight of the one or more hoist devices and a hoisted load.

7. The construction apparatus of claim 1, wherein each of the plurality of span members has a rectangular cross-sectional shape.

8. The construction apparatus of claim 1, wherein the plurality of sill brackets are configured to allow the plurality of span members to pivot about the plurality of sill brackets.

9. The construction apparatus of claim 1, wherein the second connector is mounted in a direction perpendicular to a longitudinal axis of each of the plurality of span members.

10. The construction apparatus of claim 1, wherein the second ends of the plurality of span members are configured for attachment to an installation line.

11. The construction apparatus of claim 1, wherein the plurality of span members are fitted with a covering.

* * * * *